May 1, 1945.  T. NAGEL  2,374,882
STEAM GENERATOR
Filed July 8, 1944    2 Sheets-Sheet 1

INVENTOR
Theodore Nagel
BY
James G. Bewell
ATTORNEY

May 1, 1945. T. NAGEL 2,374,882
STEAM GENERATOR
Filed July 8, 1944 2 Sheets-Sheet 2
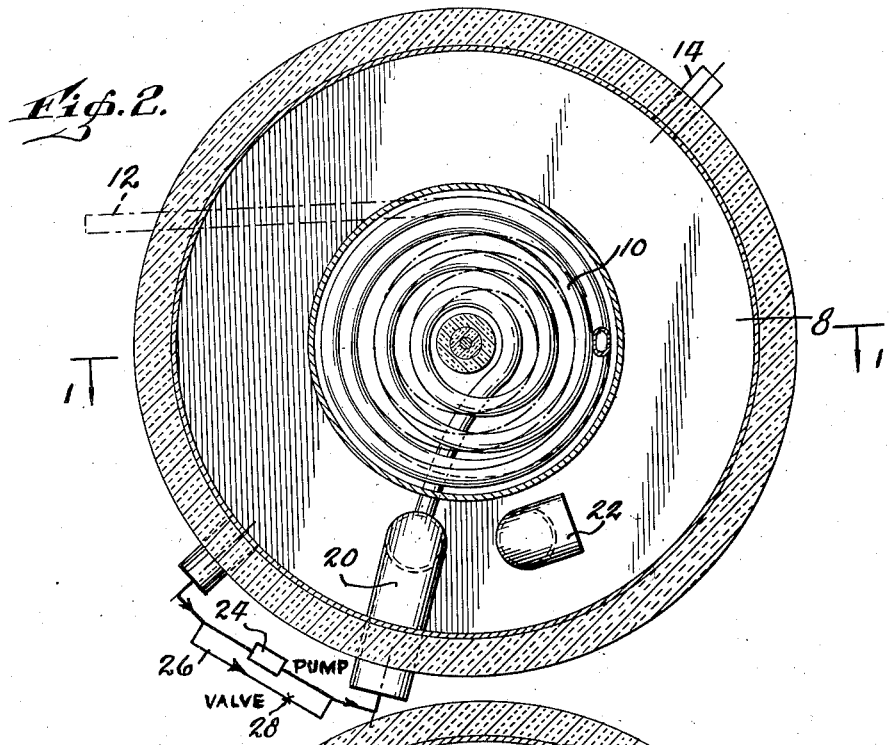
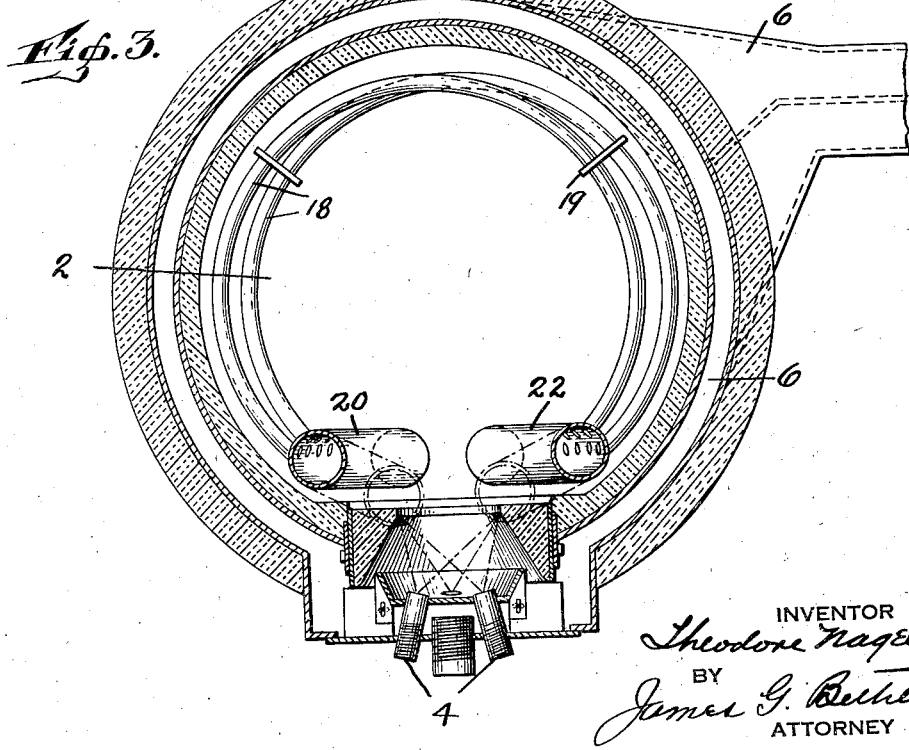
INVENTOR
Theodore Nagel
BY
James G. Bethell
ATTORNEY Patented May 1, 1945

2,374,882

UNITED STATES PATENT OFFICE 2,374,882

STEAM GENERATOR

Theodore Nagel, Brooklyn, N. Y.

Application July 8, 1944, Serial No. 544,046

6 Claims. (Cl. 122—250)

My invention relates to an improvement in steam generators.

Diesel and electric passenger locomotives are conventionally equipped with oil burning steam generating units to provide steam for heating the passenger, mail, express and baggage cars. These generators are mounted directly on the locomotive, and are unusually heavy and bulky for the space available. These generators are often out of commission for repairs and for these periods expensive motive power is out of service.

Accordingly my invention has for primary objects to provide a steam generator for this service which is lighter in weight for equal steaming capacity than the conventional generator, and to provide a design which reduces the necessity for repairs during the heating season.

In the accompanying drawings wherein I have illustrated an embodiment of my invention:

Fig. 2 is a section on the line 2—2 of Fig. 1; and

Fig. 3 is a section on the line 3—3 of Fig. 1.

Figure 1:
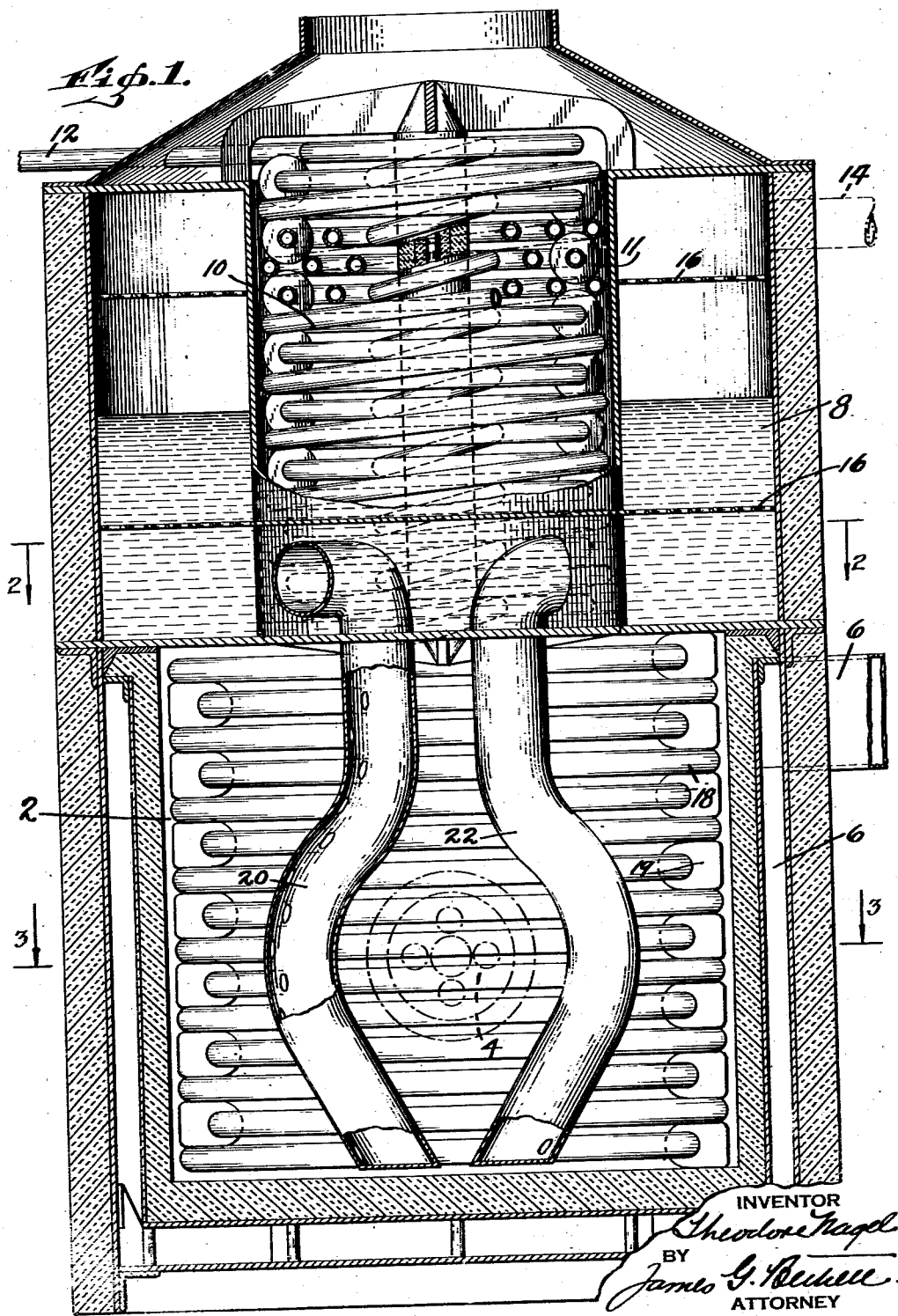
Fig. 1 is a sectional elevational view on the line 1—1 of Fig. 2.

Referring to the drawings in detail: 2 designates the combustion chamber of my improved steam generator, and 4 the burner therefor, air for combustion being supplied through ducts 6.

In the flue outlet of the generator, above the combustion chamber 2, are the steam-water separating chamber 8 and convective heat coils composing feed water circuit 10, the coils of which are separated by spacers 11. The feed-water inlet is designated 12. The steam outlet for the generator is designated 14.

The steam-water separating chamber is provided with superimposed baffles 16 for inhibiting turbulence and for promoting separation of the steam and water supplied to the chamber.

Within the combustion chamber 2 I provide a water circuit composed of radiant heat coils 18 separated by spacers 19. Also within the combustion chamber are radiant heat tubular water legs or columns 20 and 22. The water legs are interconnected by the coils 18. The upper end—feed end—of leg or column 20 is connected to the discharge or outlet end of the convective heat coils composing the feed water circuit 10, while the upper end—outlet end—of the leg or column 22 is in direct communication with the steam-water separating chamber 8.

24 designates a variable capacity water circulating pump, the suction side of which is connected to the water section of the steam-water separating chamber 8, while its delivery is connected to the feed end of the column or leg 20 of the radiant heat water circuit in the combustion chamber 2. A valve-controlled by-pass 26 is provided for the pump.

In the operation of my improved steam generator water from the convective heat coils of the feed-water circuit 10 flows into the radiant heat water column or leg 20, and through the radiant heat coils 18 of the radiant heat water circuit within the combustion chamber, into the radiant heat water leg or column 22, discharging finally into the steam-water separating chamber 8. In starting up, the by-pass valve 28 of the pump 24 is preferably left open, so that water from the chamber 8 passes directly to the water leg or column 20. Valve 28 is closed when steam is available and the pump 24 is so operated as to produce the desired rate of water circulation in the water circuit. It will be understood that the conventional feed water pump system supplies feed water to circuit 10 to compensate for the steam demand flowing out of 14.

It will be appreciated from all of the foregoing that my invention provides a simple compact water circuit steam generator having a capacity equal to the substantially heavier conventional steam generators and that my improved steam generator will remain in service for longer periods without the frequent outages of conventional steam generators, and that for these reasons my generator is admirably adapted for, by way of example, the services referred to at the outset of this specification.

It is to be understood that changes may be made in the details of construction and arrangement of parts hereinabove described within the purview of my invention.

What I claim is:

1. A steam generator comprising in combination a combustion chamber, a water feed circuit and a steam-water separating chamber, one surrounding the other, said water feed circuit and said separating chamber being superimposed upon the combustion chamber, and multiple radiant heat water circuit tube connections within the combustion chamber between the said water feed circuit and steam-water separating chamber.

2. A steam generator comprising in combination a combustion chamber, a steam-water separating chamber superimposed upon the combustion chamber, a convective heat water feed circuit surrounded by said separating chamber, and radiant heat water circuit tubes within the combustion chamber connected intermediate the water feed circuit and the steam-water separating chamber.

3. A steam generating comprising in combination a combustion chamber, a flue, a feed water circuit and a steam water separating chamber, one surrounding the other, said feed water circuit comprising convective heat tubes within said flue, and radiant heat water circuit tubes within the combustion chamber connected intermediate the water feed circuit and the steam-water separating chamber.

4. A steam generator comprising in combination a combustion chamber, a radiant heat water circuit in the combustion chamber, a feed water circuit and a steam-water separating chamber outside the combustion chamber disposed in concentric relation to each other, the feed end of the said radiant heat water circuit being connected to the outlet end of said feed water circuit, the outlet end of the radiant heat water circuit being connected to said steam water separating chamber, and a water circulating pump having its suction connected to a water outlet from the said steam-water separating chamber and its delivery connected to the feed end of said radiant heat water circuit.

5. A steam generator comprising in combination a combustion chamber, a plurality of radiant heat water tubes within said combustion chamber, a pair of tubular water columns within said combustion chamber, said radiant heat tubes being interconnected to said water columns, a feed water circuit and a steam-water separating chamber superimposed upon the combustion chamber, the outlet of said feed water circuit being connected to the feed end of one of said water columns, the outlet end of the other of said water columns being connected to said steam-water separating chamber.

6. A steam generator comprising in combination a combustion chamber, a plurality of radiant heat tubes within said combustion chamber, a pair of tubular water columns within said combustion chamber, each radiant heat tube interconnected to both of said water columns, a water feed circuit and a steam-water separating chamber outside said combustion chamber, the intake of one of said water columns being connected to the outlet end of said feed water circuit, the outlet end of the other of said water columns being connected to said separating chamber, and a water circulating pump having its suction connected to said steam water separating chamber and its delivery to the feed end of one of said water columns.

THEODORE NAGEL.